(12) United States Patent
Winn

(10) Patent No.: US 6,868,617 B1
(45) Date of Patent: Mar. 22, 2005

(54) GEAR CHECKER APPARATUS

(75) Inventor: Karen M. Winn, Berkey, OH (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/666,746

(22) Filed: Sep. 18, 2003

(51) Int. Cl.[7] .............................................. G01M 13/02
(52) U.S. Cl. .................................. 33/501.13; 33/501.19
(58) Field of Search ........................ 33/501.19, 501.13, 33/501.7, 501.11, 501.16

(56) References Cited

U.S. PATENT DOCUMENTS

| | | | | |
|---|---|---|---|---|
| 2,815,581 A | * | 12/1957 | Willy | 33/501.19 |
| 3,214,842 A | * | 11/1965 | Motz et al. | 33/501.19 |
| 3,774,313 A | * | 11/1973 | Occhialini et al. | 33/501.19 |
| 3,921,304 A | * | 11/1975 | Yagiela | 33/501.19 |
| 5,392,644 A | * | 2/1995 | Frazier | 33/501.19 |

* cited by examiner

Primary Examiner—Christopher W. Fulton
(74) Attorney, Agent, or Firm—Leslie C. Hodges

(57) ABSTRACT

A gear checker apparatus has a master gear with an outer periphery on which is spaced a plurality of complements of full face width teeth. A first complement of less than full face width teeth extends about the periphery from one of the complements of full face width teeth to the opposite side of the gear. A second complement of less that full face width teeth extends from one of the complements of full face width teeth in a direction opposite the first complement of less than fill face width teeth. In a second embodiment a third set of less that full width teeth extends between two full fare width teeth.

4 Claims, 4 Drawing Sheets

GEAR CHECKER APPARATUS

TECHNICAL FIELD

This invention relates to gear checking apparatus and, more particularly, to gear checking apparatus having a master gear meshing with a production gear in order to determine the accuracy of the production gear.

BACKGROUND OF THE INVENTION

Gear members used in power transmissions, particularly automatic power transmissions, generally have helical teeth, which are formed on automatic gear tooth forming machines. During the manufacturing process of these gears, it is possible to have the tooth malformed or a section of the tooth missing such as a nick or a break in one of the teeth.

Quite often the malformed portion of the tooth does not cover the entire full formed tooth but perhaps only half or less of the effective face width of the tooth, with a portion of the addendum and dedendum malformed. When these teeth are measured in the normal or conventional manner, the teeth of the checking gear or the master gear are fully meshed with the teeth on the production gear. With this system, the production gear might have a portion of the plane of action missing, which will not be recognized by the gear checking apparatus because of the fully engaged gear teeth. The present invention seeks to correct this disadvantage found in the current gear checking apparatus. Particularly on a checking apparatus without a gimble nick or lead check.

SUMMARY OF THE INVENTION

It is an object of the present invention to provide an improved gear tooth checking apparatus.

In one aspect of the present invention, a master gear has an outer diameter with three sections having ⅓ of the effective face width cut therein and located on one outer edge, a middle section and the opposite outer edge and the three sections providing either ⅔ of a tooth or full effective width overlap between adjacent fractional sections.

In another aspect of the present invention, the master gear has two full effective face width formed sections and two half-tooth face width formed sections.

In yet another aspect of the present invention, one-half of the gear has two one-third effective face width sections located on the outer edges and one-half of the gear has a one-third effective face width section located in the middle. All fractional sections have a two tooth overlap.

DESCRIPTION OF THE EXEMPLARY EMBODIMENTS

Figure 1:
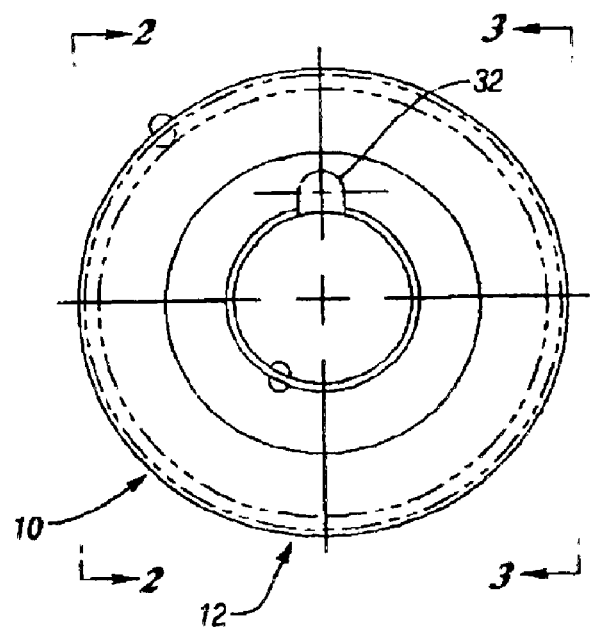
FIG. 1 is a plan view of a master gear.

As seen in FIG. 1, a master gear 10 has an outer periphery 12. The diameter 12 has formed thereon a plurality of teeth, which are formed in a substantially conventional manner.

Figure 2:
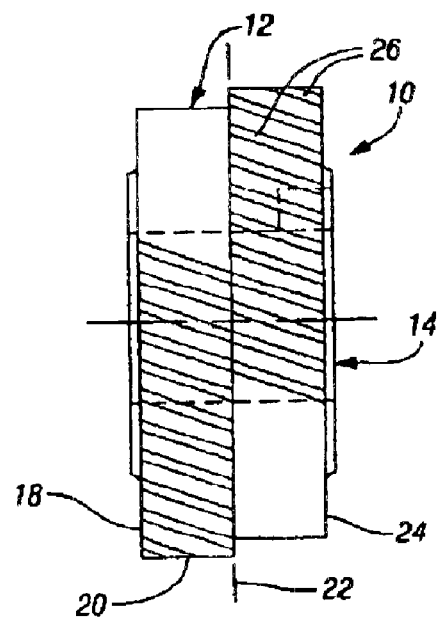
FIG. 2 is a view taken along line 2—2 of FIG. 1.
Figure 3:
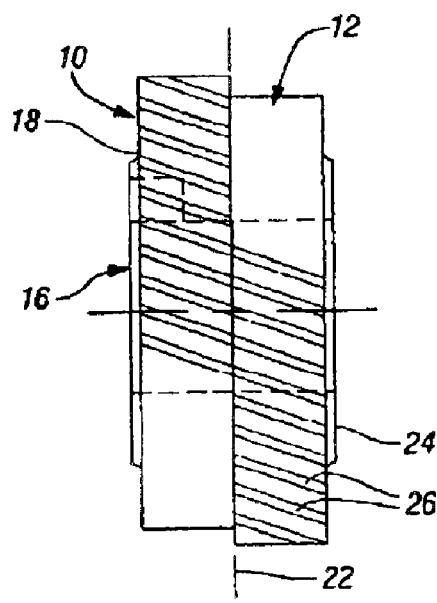
FIG. 3 is a view taken along line 3—3 of FIG. 2.

As seen in FIGS. 2 and 3, the master gear 10 has sections 14 and 16 each having a full complement or a full face width of gear tooth formed thereon. The sections 14 and 16 are formed at locations diametrically opposite sides of the master gear 10. On the left side 18 of gear 10, as viewed in FIGS. 2 and 3, it can be seen that a plurality of half-effective face width teeth 20 are formed thereon. The half face width teeth 20 extend from the left side 18 to a centerline 22 of the gear 10.

The right side 24 of gear 10 has formed thereon a plurality of half face width teeth 26, which extend from the right side 24 to the centerline 22. The outer diameter 12 of the gear 10 is cut as a flat cylindrical surface, which will not engage gear teeth when the master gear 10 is meshed with a production gear.

Figure 4:
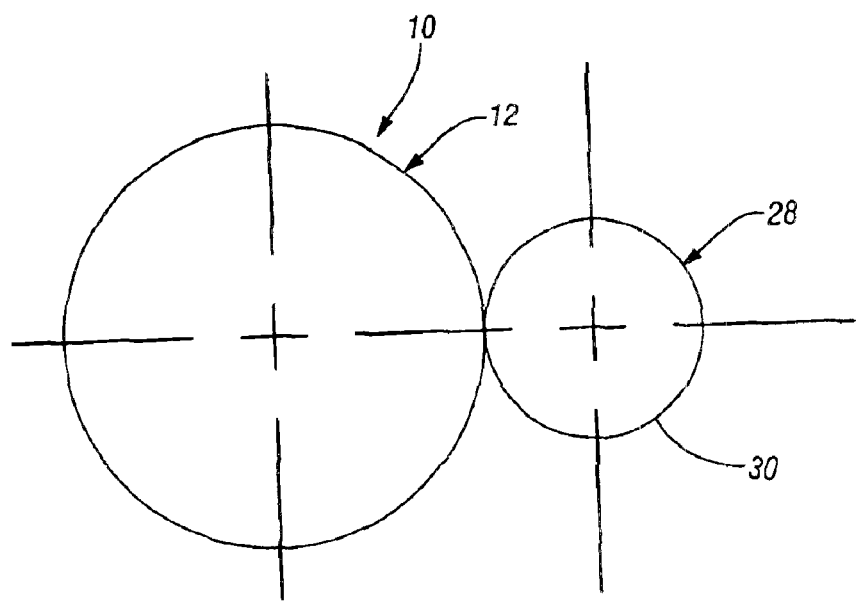
FIG. 4 is a diagrammatic representation of a master gear meshing with a production gear.

As seen in FIG. 4, the master gear 10 is meshed with a production gear 28. The production gear 28 is produced to have a full complement of teeth about the entire periphery 30. The teeth on the periphery 30 are placed in mesh with one of the full sections of teeth 14 or 16. The master gear 10 is rotated thereby driving the production gear 28 through the tooth mesh.

As the gear 10 is rotated a full revolution, the gear 28 also rotates at least a full revolution. In most instances, it is desirable to have the number of teeth on the master gear 10 equal to two times the number of teeth on the production gear 28 plus two additional teeth. By incorporating the two additional teeth on the master gear 10, the meshing of all of the teeth on the production gear 28 with only the half-teeth 20 and 26 is assured during a revolution of the master gear 10. If the production gear 28 has nicks or missing half-teeth on either half of that production gear 28, the meshing with the gear teeth 20 or 26 will be interrupted thereby causing the production gear to be rejected as not meeting the required standards.

In the embodiment shown, the master gear 10 has a notch 32, which aligns the master gear 10 properly in the machine, which will be utilized to rotate the master gear thereby driving the production gear. The embodiment shown has a master gear that is substantially twice the pitch diameter of the production gear 28 and incorporates at least twice the number of teeth on the outer periphery 12 as the production gear 28 has on the periphery 30.

In most cases, it is more desirable to have additional teeth on the master gear 10 than on the production gear 28. For example, if the production gear 28 has twenty-two teeth, it is preferable that the master gear 10 has between forty-six and fifty teeth. This ensures that the teeth on the production gear 28 will be properly checked by the master gear 10 during one revolution.

Figure 5:
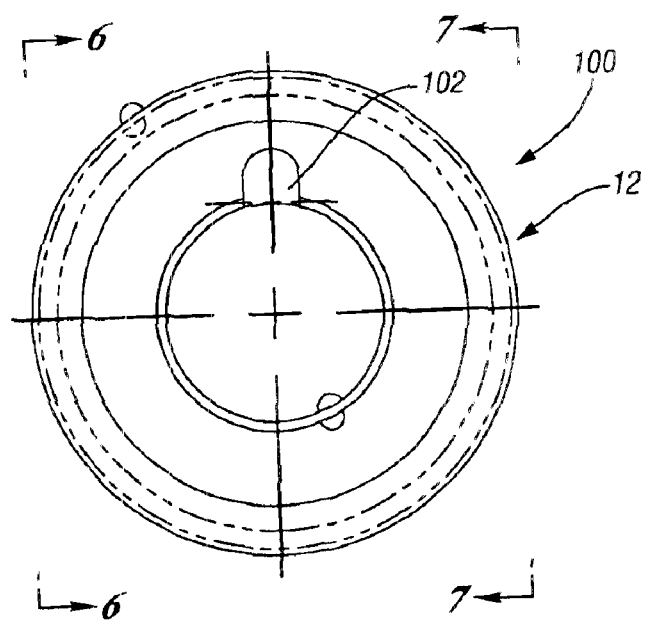
FIG. 5 is a plan view of another embodiment of the present invention.
Figure 6:
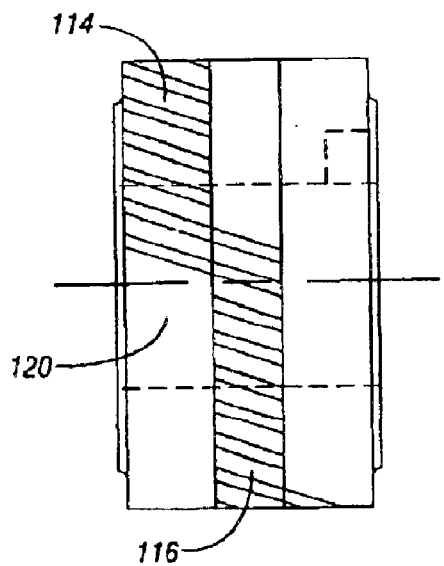
FIG. 6 is a view taken along line 6—6 of FIG. 5.
Figure 7:
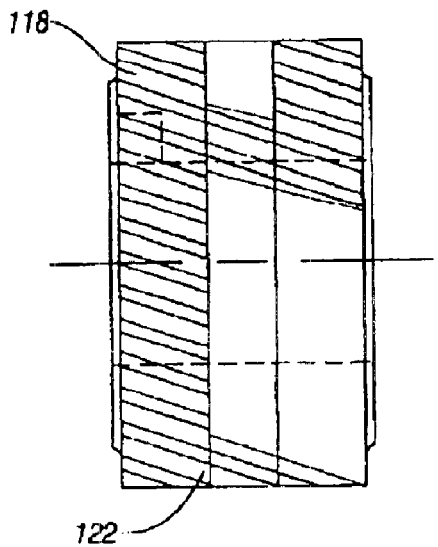
FIG. 7 is a view taken along line 7—7 of FIG. 5.

A master gear 100, shown in FIGS. 5, 6, and 7, includes a drive recess 102 formed adjacent an inner diameter 104. An outer periphery 112 includes a plurality of partial tooth sections 114, 116, and 118. Each tooth section 114, 116, and 118 is formed on one-third of the periphery 112. The tooth section 114 and tooth section 116 intersect at 120 and have formed at that intersection two-thirds of a tooth face width. Tooth sections 118 and 116 meet at 122 and combine to form two-thirds of the effective face width of each tooth. Tooth sections 114 and 118 combine at a point, not shown, and form two-thirds of the effective face width of the teeth.

The master gear 100 is placed in mesh with a production gear, not shown. The master gear 100 has a pitch diameter equal to or greater than three times the pitch diameter of the production gear, such that one rotation of the master gear 100 will gauge all of the teeth on a production gear in one-third sections at least once. The overlapping sections 120 and 122 include at least two adjacent teeth. The method of checking the production gear is the same as described above for FIGS. 1 through 4.

Figure 8:
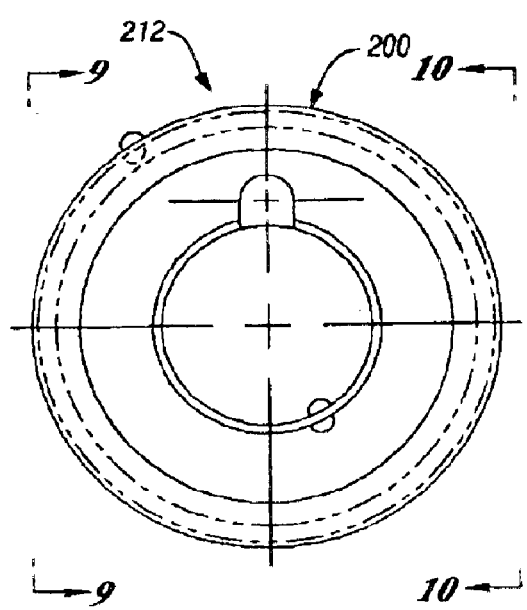
FIG. 8 is a plan view of yet another embodiment of the present invention.
Figure 9:
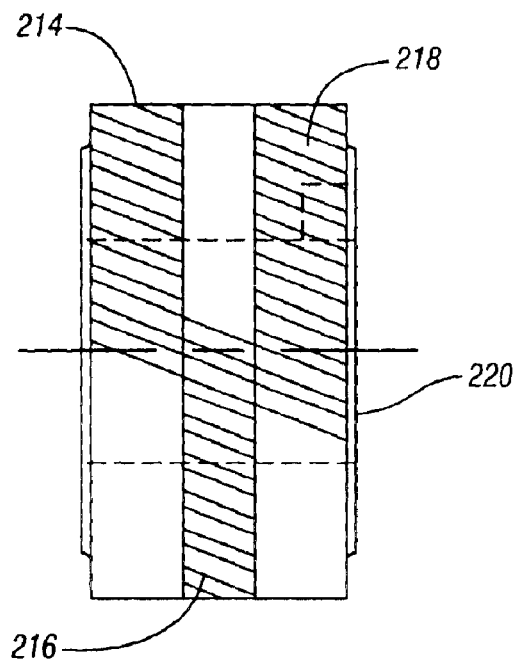
FIG. 9 is a view taken along line 9—9 of FIG. 8.
Figure 10:
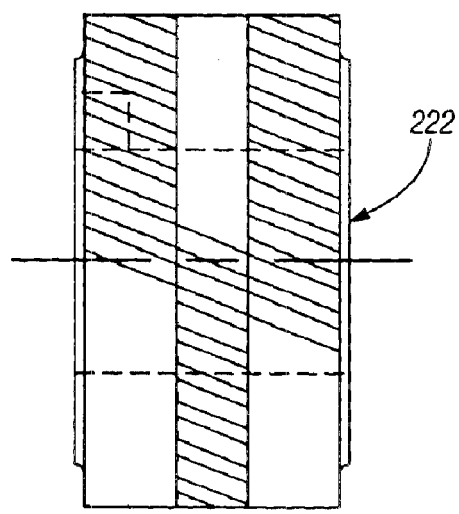
FIG. 10 is a view taken along line 10—10 of FIG. 8.

A master gear 200, shown in FIGS. 8, 9, and 10, has an outer periphery 212 having a plurality of tooth sections 214, 216, and 218. Each tooth section 214, 216, and 218 has formed therein a one-third effective face width tooth. The tooth sections 214, 216, and 218 meet at positions 220 and 222 to form a full effective face width tooth. The pitch diameter of master gear 200 is equal to at least twice the pitch diameter of a production gear, which is to be meshed therewith during inspection of the production gear.

For at least one-half of a revolution of the master gear 200, the production gear will rotate a full revolution and all of the teeth thereon will mesh with the one-third tooth face width sections 214 and 218. During a second half revolution of the master gear 200, the production gear will rotate another full revolution and the center one-third tooth face width of the production gear will mesh with the tooth section 216.

As with the test arrangement described above for FIGS. 5 through 7, the master gear 200 will gauge one-third of a tooth face width of the production gear during the inspection process. Therefore, rotation of the master gear 200 a full revolution will gauge each of the teeth on the production gear. By gauging one-third of a tooth face width on a production gear at a time, malformed gear teeth in either the one-third outer sections or the one-third middle section will be uncovered. If any of the tooth sections have a malformed section, the gear will be rejected.

What is claimed is:

1. A gear checking apparatus comprising:
    a master gear having a plurality of gear teeth formed on an outer periphery thereof;
    said master gear having a first complement of full effective face width teeth formed on said outer periphery of said gear and a second full complement of teeth formed on a diametrically opposite portion of said outer periphery of said gear; and
    said master gear having formed between said full complements of teeth a complement of half face width teeth formed on one side of said master gear at the outer periphery thereof and also having formed between said full complements of teeth a second complement of half face width teeth formed on the opposite side of said master gear at the outer periphery thereof.

2. A gear check apparatus comprising:
    a master gear having an outer periphery;
    three sections of teeth having a full face width extending from one circumferential to another circumferential edge about said outer periphery;
    a first set of partial width teeth formed from one edge of said outer periphery to an intermediate portion of said outer periphery and extending about said outer periphery from a first of said sections of full face width teeth;
    a second set of partial width teeth formed on a portion of said outer periphery non-coincidental with said first set and extending about said outer periphery from a second of said sections of full face width teeth in a direction opposite said second set of teeth;
    a circumferential space defined between said first and second set of partial width teeth; and
    A third set of partial width teeth formed in a portion of said circumferential space and extending from a third section of said full face width teeth.

3. The gear check apparatus defined in claim 2 further comprising:
    said first set of partial width teeth extends between said first and third sections of said full width teeth;
    said second set of partial width teeth extends between said second and first sections of said full width teeth; and
    said third set of partial width teeth extends between said third and said second sections of said full width teeth.

4. The gear check apparatus defined in claim 2 further wherein:
    Each of said first, second, and third sets of partial width teeth each encompass at least one third of the peripheral circumference of said master gear.

* * * * *